Figure 1:
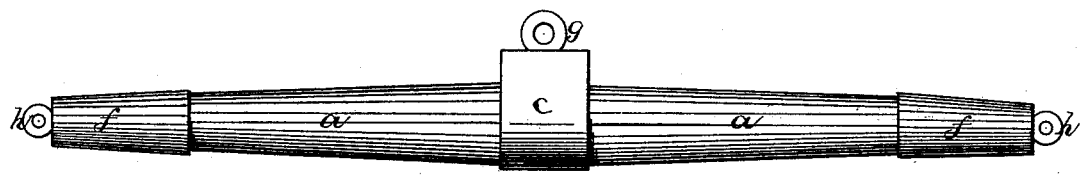
Figure 2:
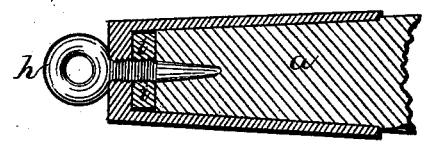
Figure 3:
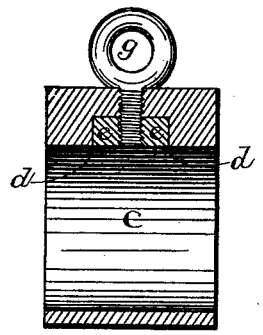

D. FOLEY.
Whiffletree.

No. 215,111. Patented May 6, 1879.

UNITED STATES PATENT OFFICE.

DENIS FOLEY, OF SAUGATUCK, CONNECTICUT.

IMPROVEMENT IN WHIFFLETREES.

Specification forming part of Letters Patent No. 215,111, dated May 6, 1879; application filed March 15, 1879.

*To all whom it may concern:*

Be it known that I, DENIS FOLEY, of Saugatuck, in the county of Fairfield and State of Connecticut, have invented certain new and useful Improvements in Whiffletrees; and I do hereby declare the following to be a full, clear, and exact description of the invention, such as will enable others skilled in the art to which it pertains to make and use it, reference being had to the accompanying drawing, which forms part of this specification.

My invention relates to an improvement in whiffletrees.

It consists in securing the ring or band which passes around the center of the tree in position by forming a recess in one side to receive a nut, and then screwing an eyebolt through the ring and nut.

It also consists in attaching the ferrules on the ends of the tree by placing a nut inside of the ferrule, and then screwing through the nut a sharp-pointed eyebolt, the end of the bolt passing into the end of the tree and expanding it outward against the inside of the ferrule, as will be more fully described hereinafter.

The accompanying drawing represents my invention.

$a$ represents the whiffletree, and $c$ the usual band or ring around its center. On the rear side of the tree this band is thickened, and on the inside of the band is formed the recess $d$ in the thickened portion to receive a nut, $e$, which is so held that it cannot turn around. Through the band and through the nut thus held is passed the eyebolt $g$.

The recess $d$ should be made just deep enough to have the nut flush with the inner surface of the band, so that it will not interfere when the band is being placed upon the tree, and will form a bearing afterward.

The great advantage of this fastening is, that it does not require a hole through the tree, and does not weaken the tree in any manner, and should the tree become worn or broken it can readily be removed and replaced by another one.

The ferrules $f$ on the ends of the tree also have nuts $i$ placed inside of them, and through the ferrules and nuts are passed the eyebolts $h$, which bolts have the threads on them made just long enough to pass through the nuts. From the end of the thread the bolt is tapered almost to a point, and made long enough to penetrate the end of the tree some distance. As this end enters the end of the tree it is expanded so as to tightly fill the ferrule.

Having thus described my invention, I claim—

1. The combination of the tree $a$, band $c$, nut $e$, and eyebolt $g$, substantially as shown.

2. The combination of the tree $a$, ferrule $f$, nut $i$, and bolt $h$, the end of the bolt being made long and tapering, so as to enter the end of the tree and expand it against the inside of the ferrule, substantially as described.

In testimony that I claim the foregoing I have hereunto set my hand this 10th day of March, 1879.

DENIS FOLEY.

Witnesses:
    E. L. STEVENSON,
    J. E. HUBBELL.